US010229315B2

(12) United States Patent
Yellapragada et al.

(10) Patent No.: US 10,229,315 B2
(45) Date of Patent: Mar. 12, 2019

(54) IDENTIFICATION OF DUPLICATE COPIES OF A FORM IN A DOCUMENT

(71) Applicant: INTUIT INC., Mountain View, CA (US)

(72) Inventors: Vijay Yellapragada, Mountain View, CA (US); Peijun Chiang, Mountain View, CA (US); Sreeneel K. Maddika, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 239 days.

(21) Appl. No.: 15/221,057

(22) Filed: Jul. 27, 2016

(65) Prior Publication Data
US 2018/0032811 A1    Feb. 1, 2018

(51) Int. Cl.
*G06K 9/00*    (2006.01)
*G06K 9/62*    (2006.01)

(52) U.S. Cl.
CPC ..... *G06K 9/00483* (2013.01); *G06K 9/00449* (2013.01); *G06K 9/00463* (2013.01); *G06K 9/6202* (2013.01); *G06K 9/6232* (2013.01)

(58) Field of Classification Search
CPC ........... G06K 9/00483; G06K 9/00449; G06K 9/6232; G06K 9/00463; G06K 9/6202
See application file for complete search history.

(56) References Cited

U.S. PATENT DOCUMENTS

| 6,658,423 | B1 | 12/2003 | Pugh et al. | |
|---|---|---|---|---|
| 9,019,570 | B1 * | 4/2015 | Kanneganti | H04N 1/40062 358/448 |
| 9,043,349 | B1 * | 5/2015 | Lin | G06K 9/18 382/257 |
| 2004/0210575 | A1 | 10/2004 | Bean et al. | |
| 2008/0050004 | A1 * | 2/2008 | Silverbrook | G06Q 10/087 382/135 |
| 2009/0285471 | A1 * | 11/2009 | Wall | G06K 9/00986 382/137 |
| 2011/0249905 | A1 * | 10/2011 | Singh | G06K 9/00449 382/225 |
| 2012/0093421 | A1 * | 4/2012 | Kletter | G06K 9/00463 382/209 |
| 2014/0355865 | A1 | 12/2014 | Cantley et al. | |
| 2017/0286767 | A1 * | 10/2017 | Panferov | G06K 9/00463 |
| 2017/0330049 | A1 * | 11/2017 | Kalyuzhny | G06K 9/00449 |

OTHER PUBLICATIONS

International Search Report and Written Opinion dated Aug. 17, 2017 for Application No. PCT/US2017/031000.

* cited by examiner

*Primary Examiner* — John B Strege
(74) *Attorney, Agent, or Firm* — Patterson + Sheridan, LLP

(57) ABSTRACT

Aspects of the present disclosure provide methods and apparatuses for detecting duplicate copies of a form in an image of a document. An exemplary method generally includes obtaining a first digital image of a document, performing one or more transformations on the first digital image, determining one or more rectangles in the transformed first digital image, identifying at least a first duplicate copy of the form being depicted in the first digital image based, at least in part, on the detected one or more rectangles, and generating, based on the identified duplicate copy of the form, a notification that the first digital image includes at least the first duplicate copy of the form.

20 Claims, 7 Drawing Sheets

IDENTIFICATION OF DUPLICATE COPIES OF A FORM IN A DOCUMENT

BACKGROUND

Field

The present disclosure generally relates to processing digital images of documents or forms. More specifically, the present disclosure provides techniques for identifying duplicate copies of a form in a digital image of a document.

Related Art

Data processing and exchange are essential for a variety of business and personal transactions. For example, small businesses use accounting and inventory data to obtain and share reports regarding inventory sales, customer invoices, and/or cash flow. Similarly, healthcare providers examine medical records to view patient information related to insurance providers, medical conditions, and/or office visits.

In addition, data exchange frequently relies on electronic documents such as word-processing documents, spreadsheets, and/or Portable Document Format (PDF) documents. For example, a business may manage business transactions with a set of customers by creating a set of bills, invoices, and/or other types of electronic documents containing data associated with the business transactions and transmitting the electronic documents to the respective customers via email. The customers use the data in the electronic documents to pay the bills or invoices, respond to the business, or update their records of the transactions. Similarly, companies, banks and mortgage companies may provide several tax documents (e.g., e.g., W-2, 1099-Int, etc.) to employees and customers as needed to file their tax returns, for example, by using commercially available income tax preparation software.

However, variations in the layouts and/or designs of electronic documents can disrupt the process of extracting data from the electronic documents. For example, a common feature of tax-related documents is to include duplicate copies of the same form (e.g., W2) on the same page of a document. In some cases, a user may try to take an image of the entire tax-related document, including the duplicate copies of the form. In other cases, a user may try to capture a single image of two independent tax-related forms (e.g., a W2 from two separate employers). As a result, in either case, the resolution of the image of a single copy of the form may not be adequate enough to process text data in the form using optical character recognition (OCR) such that the text data would be usable by income tax preparation software.

SUMMARY

Aspects of the present disclosure provide a computer-implemented method for detecting duplicate copies of a form in an image of a document. The computer-implemented method generally includes obtaining the first digital image of the document, performing one or more transformations on the first digital image, detecting one or more rectangles in the transformed first digital image, identifying at least a first duplicate copy of the form being depicted in the first digital image based, at least in part, on the detected one or more rectangles, and generating, based on the identified duplicate copy of the form, a notification that the first digital image includes at least the first duplicate copy of the form.

Another embodiment provides a computer-readable storage medium having instructions, which, when executed on a processor, performs an operation for detecting duplicate copies of a form in an image of a document. The operation generally includes obtaining the first digital image of the document, performing one or more transformations on the first digital image, detecting one or more rectangles in the transformed first digital image, identifying at least a first duplicate copy of the form being depicted in the first digital image based, at least in part, on the detected one or more rectangles, and generating, based on the identified duplicate copy of the form, a notification that the first digital image includes at least the first duplicate copy of the form.

Still another embodiment of the present invention includes a processor and a memory storing a program, which, when executed on the processor, performs an operation for detecting duplicate copies of a form in an image of a document. The operation generally includes obtaining the first digital image of the document, performing one or more transformations on the first digital image, detecting one or more rectangles in the transformed first digital image, identifying at least a first duplicate copy of the form being depicted in the first digital image based, at least in part, on the detected one or more rectangles, and generating, based on the identified duplicate copy of the form, a notification that the first digital image includes at least the first duplicate copy of the form.

DETAILED DESCRIPTION

Figure 1:
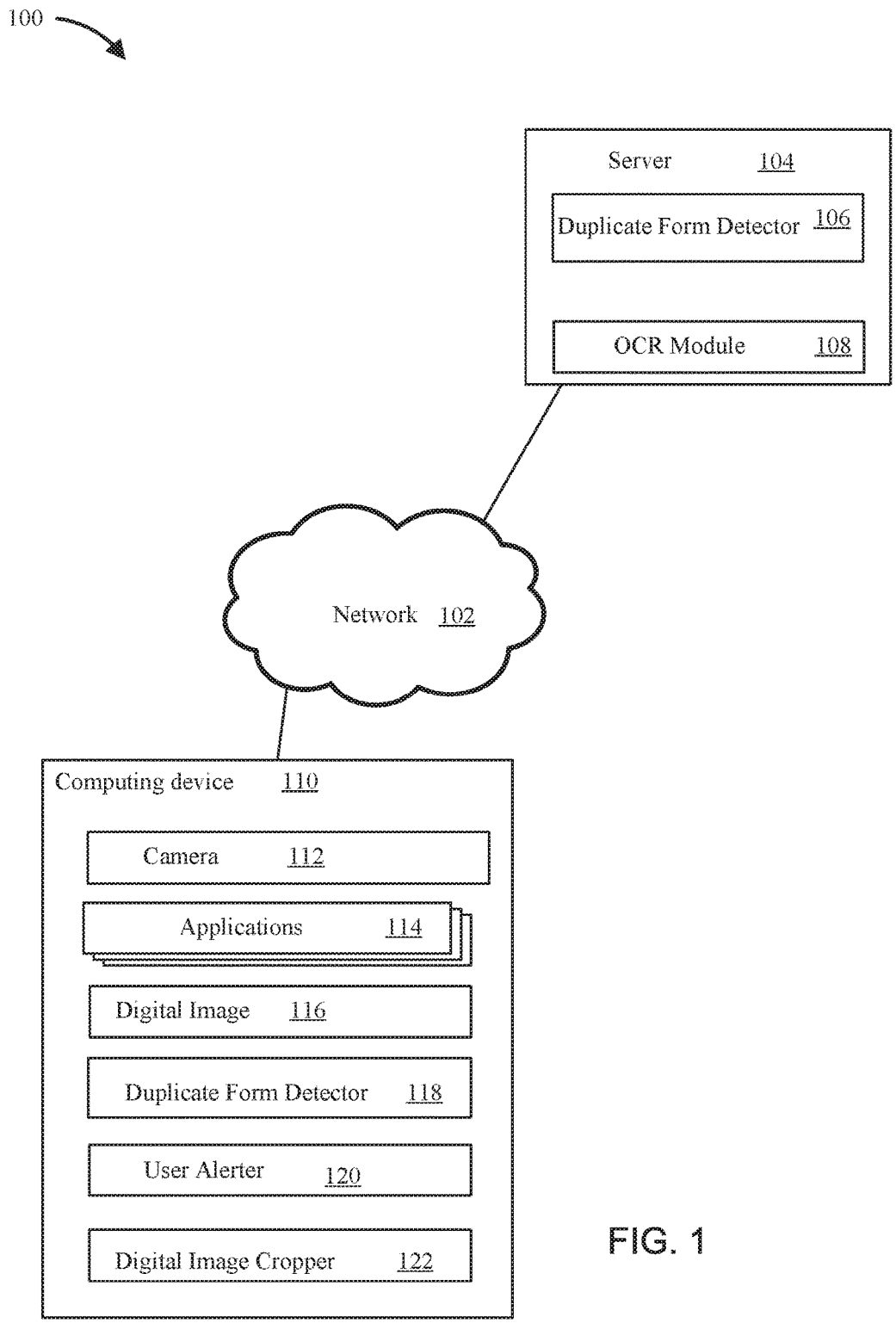
FIG. 1 illustrates an example computing environment that may be used to practice techniques of the present disclosure.

Optical character recognition (OCR) techniques are generally used to convert images of text into computer-encoded text. OCR results tend to be more accurate when used to evaluate high-resolution, low-noise images of typed, black text against a white background. However, in practice, text in digital images is often noisy, obscured, or otherwise less than ideal. In some cases, for example, a physical document may be relatively obscured or deteriorated as a result of decomposition, excessive use, folding, fingerprints, water damage, or mildew at the time an image of the document is captured. Of course, an image of a document may be of poor-quality for a variety of other reasons (e.g., if the document is no longer extant and better images therefore cannot be obtained). Poor image quality tends to increase OCR processing time and decrease final accuracy. Thus, OCR techniques often fail to produce satisfactory results on poor-quality images.

In order to make information more readily accessible and searchable, individuals, businesses, and governmental agencies often digitize paper forms. For example, the Internal Revenue Service (IRS) may wish to digitize tax forms (e.g., 1040, W2, 1098-T, or 1099-MISC) submitted on paper so that information from the tax forms can be inspected for errors by an automated process. In another example, a law firm may digitize a large number of paper forms received in response to a discovery request so that the documents can be electronically searched for certain keywords. In another example, a web-based genealogical research company may wish to digitize a large number of death certificates in order to make information from the death certificates electronically searchable for customers.

Forms are often used to collect, register, or record certain types of information about an entity (e.g., a person or a business), a transaction (e.g., a sale), an event (e.g., a birth), a contract (e.g., a rental agreement), or some other matter of interest. A form typically contains fields or sections for specific types of information associated with the subject matter of the form. A field is typically associated with one or more labels identifying the type of information captured in the field. For example, a W2 form includes a field labeled "social security number," which stores a social security number. In another example, a death certificate typically contains at least one field that is associated with the label name (e.g., "first name" or "last name") in order to identify the deceased person to whom the certificate applies. In another example, a paper receipt could include field indicating a total amount due for a transaction for which the receipt was issued.

In some cases, individuals may wish to use commercially available income-tax preparation software, capable of performing OCR on images of tax-related documents, to prepare their income taxes. A common problem faced when performing OCR is with the tax-related documents themselves, even when in "good" condition for performing OCR. Specifically, such tax-related documents frequently include duplicate copies of the same form (e.g., W2) on the same page of a document. In some cases, a user may try to take an image of the entire tax-related document, including the duplicate copies of the form. In some cases, a user may try to take an image of the entire tax-related document, including the duplicate copies of the form. In other cases, a user may try to capture a single image of two independent tax-related forms (e.g., a W2 from two separate employers). As a result, the resolution of the image of a single copy of the form may not be adequate enough, as described above, to process text data in the form using OCR such that the text data would be usable by income tax preparation software. Further, in some cases, this may put an additional burden on a server-side backend to perform the OCR on duplicate copies, collate resources, and reconcile duplicates.

Accordingly, aspects of the present disclosure provide techniques for detecting multiple copies of a form (e.g., a tax-related document) in an image of a document. Doing so may improve OCR performance, reduce processing time, and prevent certain errors in treating independent instances of forms (e.g., as two distinct W2 forms) as duplicates of the same form. As discussed below, identifying duplicate copies of a form in an image of a document may be based on, for example, rectangular shapes appearing in the image. For example, identification of duplicate copies of a form may be based on a number of rectangular shapes in the digital image, an area of each of the rectangular shapes, and/or a pattern of the rectangular shapes.

In some cases, when the income-tax preparation software detects multiple copies of a form in a user-captured image of a document, the user may be alerted to capture another image that focuses on a single copy of the form. Additionally, in some cases, the processing backend may be informed of the (potential) duplicate form in the image, such that the backend could potentially pre-process the image, for example, to crop out only the relevant portion of the image of the document.

FIG. 1 illustrates a computing environment 100 that may be used to perform techniques described in the present disclosure. A computing device 110 and a server 104 communicate via a network 102. As shown, the computing device 110 includes a camera 112 used to capture document images. In addition, the computing device 110 may be used to execute applications 114 (e.g., income-tax preparation software). In some cases, a user of the computing device 110 captures a first digital image 116 of document using the camera 112. One of the applications 114 may send the digital image 116 of the document to the server 104. In an alternative embodiment, a scanner may be used in place of the camera 112.

As noted above, in some cases, the document may be a tax-related document, which includes duplicate copies of a same form. In other cases, the document could be two (or more) distinct copies of the same form (e.g., W2s from two different employers). According to certain aspects, if a user-captured digital image contains copies of a same form, a duplicate form detector 118 in the computing device 110 may detect the copies, for example, as described in greater detail below. Note, that the server 104 may also include a duplicate form detector 106 which can perform the same functions as the duplicate form detector 118. For example, instead of the duplicate form detector 118 identifying duplicate forms in the digital image 116, the computing device may transmit the digital image 116 to the server 104 (e.g., via the Network 102) and the duplicate form detector 106 may identify duplicate forms in the digital image 116.

The computing device 110 also includes a user alert component 120 which may prompt a user to capture a second digital image that is focused on a single copy of a form, for example, when the duplicate form detector 118 determines duplicate copies of a form are present in the first digital image 116. Further, the computing device 110 may include a digital image cropper 122, which can crop the digital image 116 such that only one copy of a form is depicted in the digital image 116. In some cases, the digital image cropper 122 may generate and transmit a notification to the server 104 that the digital image 116 contains duplicate copies of a form. This notification may be used by the server 104 to, for example, crop out only the relevant portion of the image of the document in the digital image 116.

Once the user has re-captured a digital image focused on a single copy of a form or the digital image 116 has been cropped (e.g., by the computing device 110 or server 104), the OCR module 108 can extract text from the digital image. In some cases, the OCR module 108 may also recognize the type of form in the digital image.

While the server 104 is depicted as a single server, it should be understood that techniques of the present disclosure can be applied in a cloud-based scheme using multiple physical or virtual computing resources. The duplicate form detector 106 and the OCR module 108 can be distributed across different computing resources as part of a cloud-based computing system. Further, the computing device 110 is included to be representative of a variety of devices, such as a mobile device, a cellular phone, a smart phone, a tablet, a laptop computer, a desktop computer, a personal digital assistant (PDA), or any computing system that may execute software applications.

Figure 2:
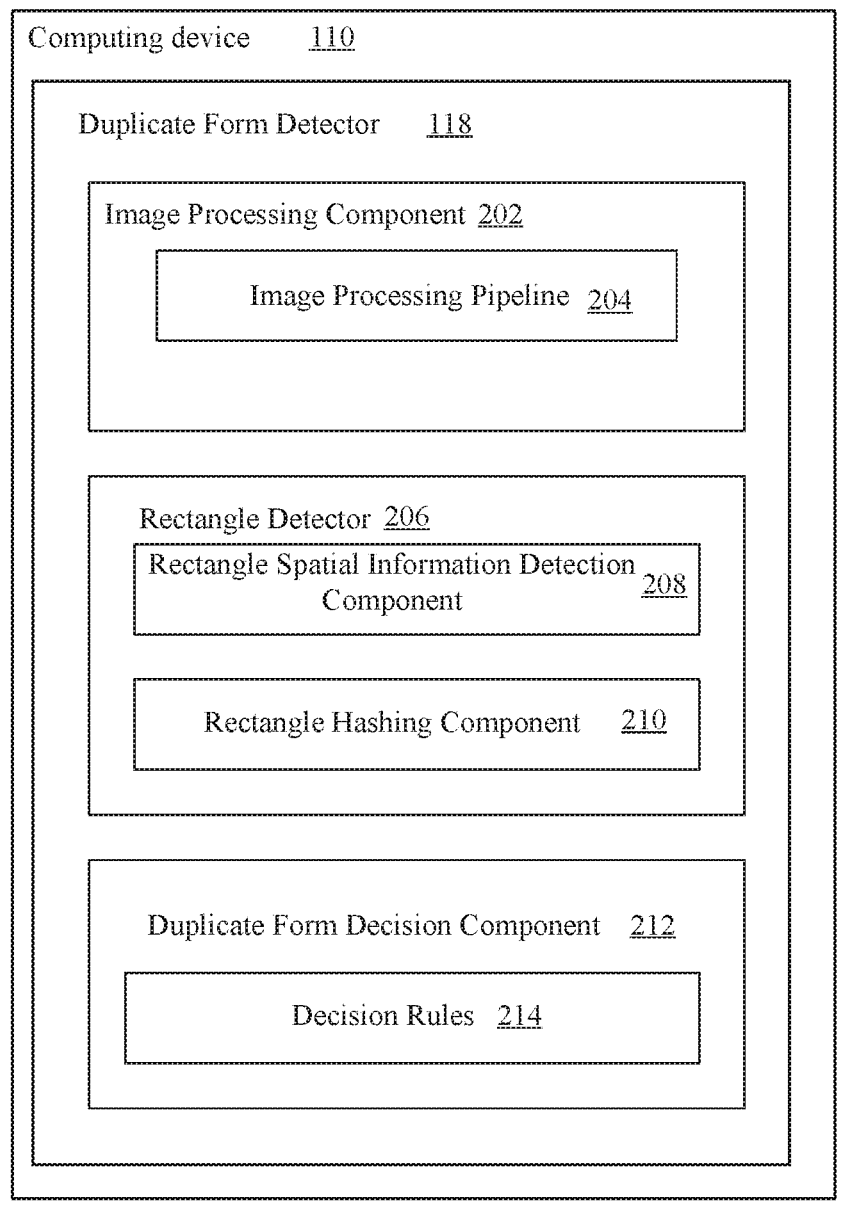
FIG. 2 illustrates various components of a duplicate form detector configured to detect duplicate copies of a form in an image of a document, according to certain aspects of the present disclosure.

FIG. 2 illustrates a more detailed view of various components that make up the duplicate form detector 118. As illustrated, the duplicate form detector 118 may include an image processing component 202 configured to prepare a user-captured digital image (e.g., digital image 116) for duplicate form detection. The image processing component 202 may include an image processing pipeline 204 used to perform various transformations on the digital image 116. For example, the image processing pipeline 204 may be configured to scale down the digital image (e.g., for better performance), apply grayscale to the digital image, apply a morphological gradient operation to the digital image, apply binarization (e.g., OTSU) to the digital image, connect horizontally oriented regions of the digital image, run a findContours operation on the digital image, and/or filter out certain contours (e.g., small contours since large rectangles will be used to determine duplicate copies). The image processing component 202 may provide the transformed digital image to the rectangle detector 206 of the duplicate form detector 118 for detection of rectangular shape (i.e., rectangles) in the transformed digital image.

The rectangle detector 206 may detect a number of rectangles in the transformed digital image. The rectangle spatial information detection component 208 may then determine spatial information associated with the detected rectangles. For example, in some cases, the rectangle spatial information detection component 208 may determine an area (e.g., a number of pixels) in each identified rectangle and sort the identified rectangles by area. In other cases, the rectangle spatial information detection component 208 may determine other spatial information such as alignment of the detected rectangles in the image of the document. The duplicate form decision component 212 may use the sorted rectangles to decide whether the transformed digital image (and thereby the digital image 116) comprises duplicate copies of a form. For example, this decision may be based on one or more decision rules 214/heuristics. As will be explained in greater detail below with reference to FIGS. 6A and 6B, the decision rules 214 may comprise one or more rules for deciding that a digital image comprises duplicate copies of a form based on the number of identified rectangles, the area comprised by each of the number of identified rectangles, and/or a hashing performed (e.g., by the rectangle hashing component 210) on each identified rectangle.

According to certain aspects, if it is decided by the duplicate form decision component 212 that the digital image comprises duplicate copies of a form, the duplicate form decision component 212 may indicate to the user alert component 120 to notify the user of the computing device 110 to re-capture the digital image 116, or may indicate to the digital image cropper 122 or the server 104 to crop the digital image 116.

Figure 3:
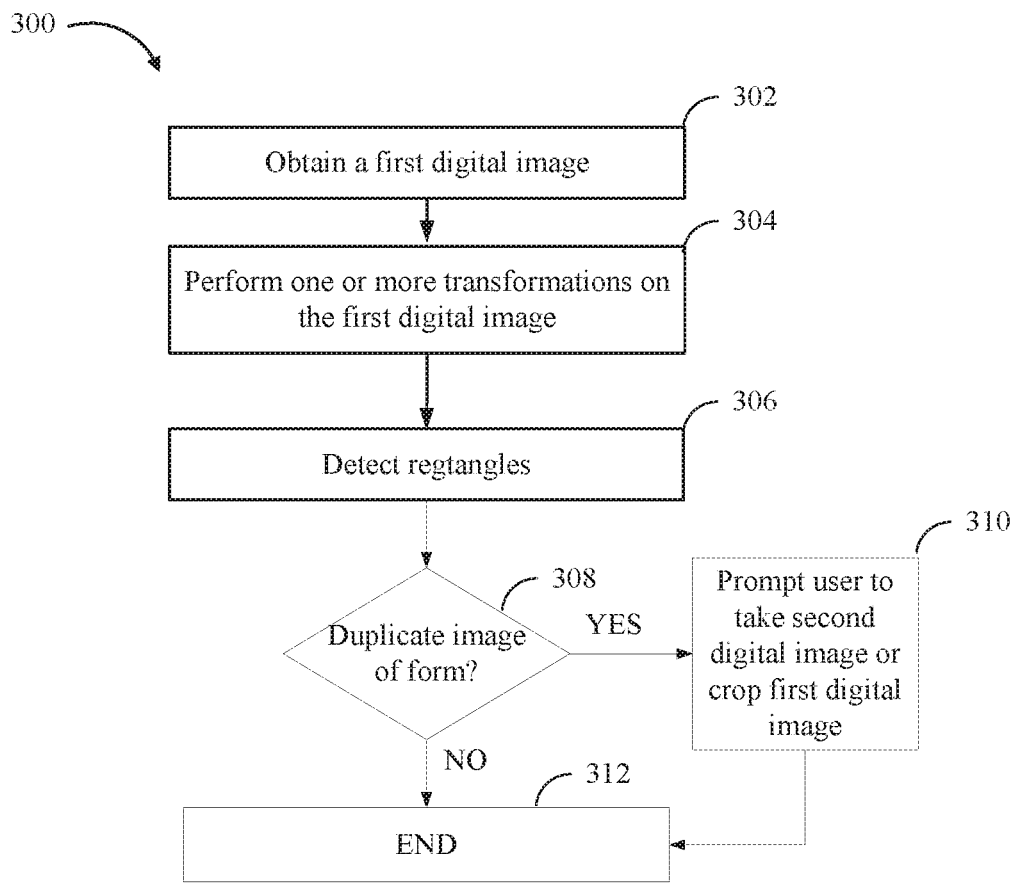
FIG. 3 illustrates a method for identifying duplicate copies of a form in an image of a document, according to certain aspects of the present disclosure.

FIG. 3 is a flow diagram illustrating an exemplary method 300 for identifying duplicate copies of a form in a digital image of a document, according to certain aspects of the present disclosure. The method 300 may be performed, for example, by a computing device 110 and/or a server 104.

The method 300 begins at 302 by obtaining a first digital image of the document. As noted above, this may involve a user capturing the first digital image (e.g., digital image 116) of the document using a camera (e.g., camera 112). The digital first image may then be forwarded to and obtained by, for example, a component configured to detect whether the first digital image of the document comprises duplicate copies of a form (e.g., the duplicate form detector 118).

At 304, the first digital image is prepared for identifying a duplicate form in the first digital image, for example, by performing one or more transformations on the first digital image. For example, the image processing component 202 may receive the first digital image and may perform one or more transformations on the first digital image, such as scaling down the first digital image, gray-scaling the first digital image, applying a morphological gradient operation on the first digital image. It should be noted that these transformations will be described in greater detail below with reference to FIG. 5.

At 306, the image processing component 202 may provide the rectangle detector 206 with the transformed first digital image for determining one or more rectangles in the transformed first digital image. According to certain aspects, the rectangle detector 206 may detect one or more rectangles in the transformed first digital image and an area comprised by each detected rectangle. The rectangle detector 206 may then sort the detected rectangles into approximately equal sized areas and/or perform hashing on each of the detected rectangles to determine a template-type of a form in the transformed first digital image. Aspects of the present disclosure related to rectangle identification/determination/detection will be described in greater detail below with reference to FIGS. 6A and 6B.

At 308, the duplicate form decision component 212 receives an output from the rectangle detector 206 and may identify that the first digital image comprises a duplicate copy of a form based, at least in part, on the detected one or more rectangles. According to certain aspects, the duplicate form decision component 212 may take into account certain rules (e.g., decision rules 214) when determining that the first digital image comprises the duplicate copy of the form, for example, as explained in greater detail below.

According to certain aspects, if, at 308, it is identified that the first digital image comprises a duplicate copy of a form, a notification 310 may be generated prior to 312 indicating that the first digital image comprises the duplicate form. In some cases, this notification 310 may be displayed to the user, instructing the user to capture a second digital image that is focused on a single copy of the form. In other cases, this notification 310 may be provided to a digital image cropper 122 in the computing device 110 or server 104, instructing the digital image cropper 122 to crop out the duplicate copy of the form from the first digital image. According to certain aspects, if the notification is transmitted to the server 104, it may be assumed that the first digital image is transmitted along with the notification. In some cases, the notification may instruct the digital image cropper 122 where to crop the first digital image.

According to certain aspects, if, at 308, a duplicate copy of a form is not identified in the first digital image, the computing device 110 may transmit, at 314, the first digital image to the server 104 for processing (e.g., OCR processing).

Figure 4:
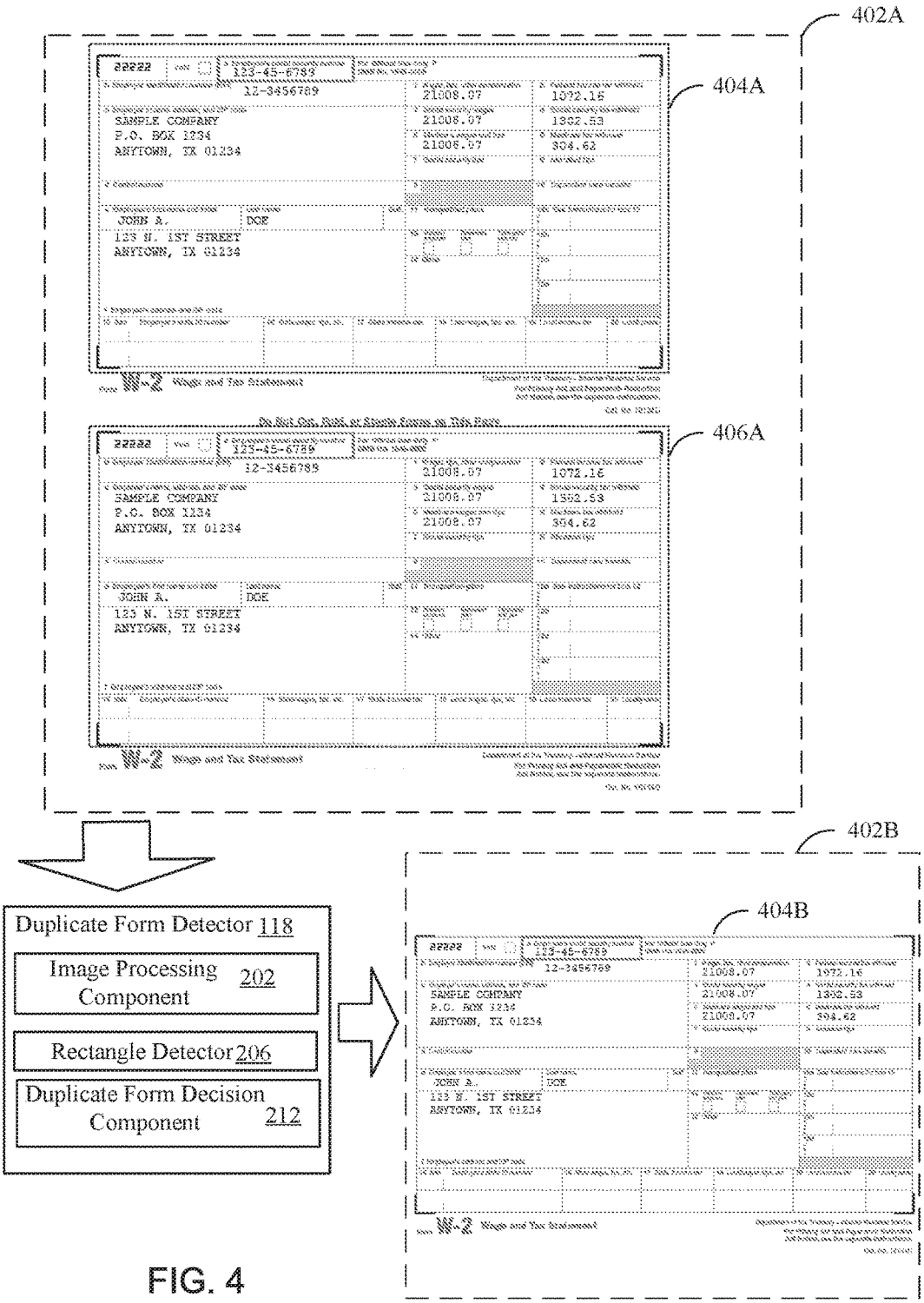
FIG. 4 illustrates a process for identifying duplicate copies of a form in a document, according to certain aspects of the present disclosure.

FIG. 4 is a graphical illustration of a process for identifying duplicate copies of a form in a document, according to certain aspects of the present disclosure. For example, as illustrated, a user may capture a digital image 402A of a document. The digital image 402A may comprise two copies of a form, for example, a first copy 404A and a second copy 406A. As illustrated, the form in FIG. 4 may comprise a W2 tax form.

According to certain aspects, the digital image 402A may be input into the duplicate form detector 118 of the computing device 110 for detection/identification of duplicate forms. For example, as described above, the image processing component 202 may prepare the digital image 402A for identification of duplicate forms by performing various transformations on the image. The image processing component 202 may then pass the transformed digital image 402A onto the rectangle detector 206 to identify a number of rectangles in the transformed digital image 402A. Additionally, as noted above, the rectangle detector 206 may determine areas comprised by each of the number of rectangles and may also perform hashing on the identified rectangles to determine a form type (e.g., W2) of the copies of the forms 404A and 406A.

The duplicate form decision component 212 may then decide whether the digital image 402A comprises duplicate copies of a form. For example, as shown in this case, the duplicate form decision component 212 will decide/detect that the digital image 402A comprises duplicate copies of a form, namely the first copy 404A and the second copy 406A. According to certain aspects, this decision may be based on a set of rules (e.g., decision rules 214), which operate to indicate that a digital image has duplicate copies of a form based on, for example, a number of rectangles in the digital image, areas of the rectangles in the digital image, and/or a hashing of rectangles in the digital image, as explained in greater detail below with reference to FIGS. 6A and 6B.

In some cases, for example, as illustrated, if the duplicate form decision component 212 decides that the digital image 402A comprises duplicate copies of a form, the duplicate form detector 118 may instruct the digital image cropper to crop the digital image 402A to produce a cropped digital image 402B, which comprises only a single copy of the form 404B. As noted above, this cropping feature may be performed in the server 104. In other cases, the duplicate form detector 118 may instruct the user alert component 120 to request that the user take another digital image, focusing on a single copy of the form. The computing device may then send the digital image comprising the single copy of the form to the server 104 for processing, such as OCR processing.

Figure 5:
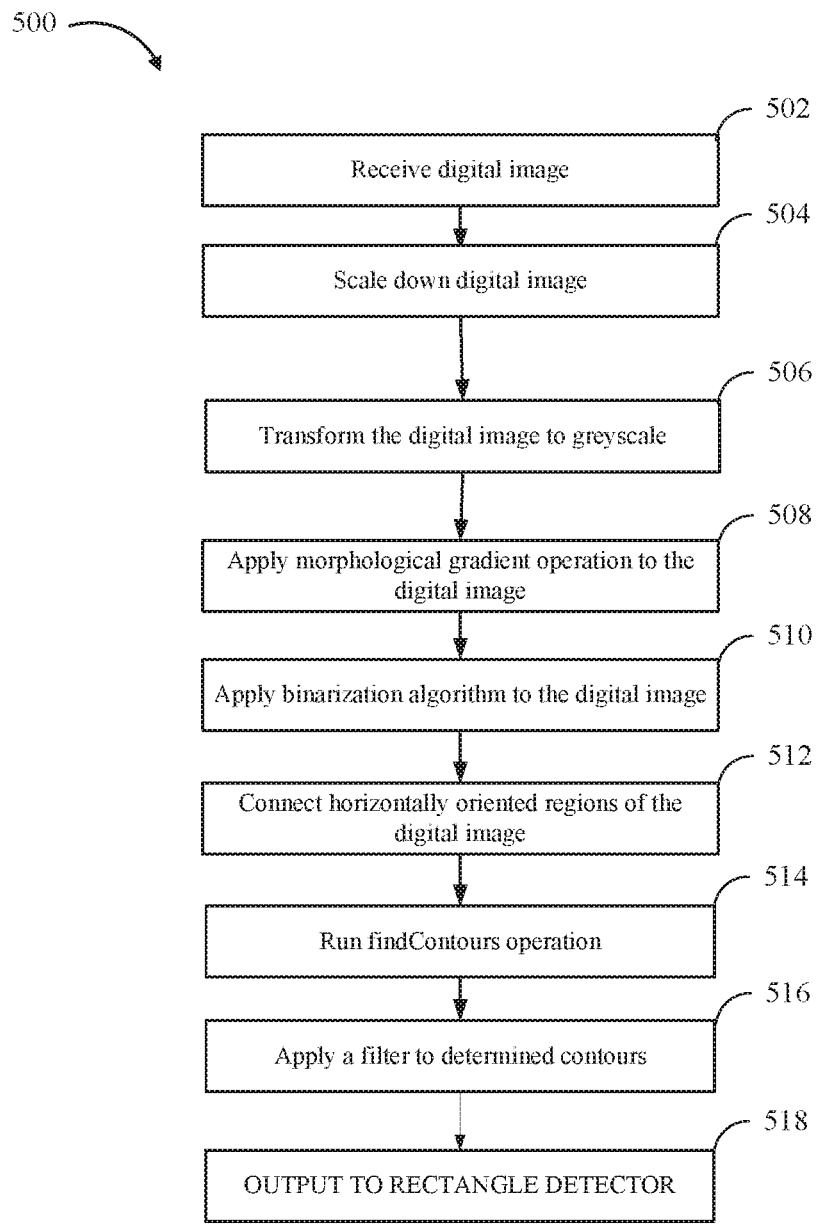
FIG. 5 illustrates a method for preparing an image of a document for duplicate form recognition, according to certain aspects of the present disclosure.

FIG. 5 illustrates example operations 500 for preparing a digital image of a document for duplicate form recognition, according to certain aspects of the present disclosure. According to certain aspects, example operations 500 may be performed by a device capable of preparing a digital image for duplicate form recognition, such as the image processing component 202 of the computing device 110.

Operations begin at 502 with the digital image processing component receiving a digital image, for example, from a camera in the computing device 110. At 504, the digital image processing component may scale down the digital image to improve processing performance (e.g., a smaller image uses less processing power). At 506, the image processing component may remove any color from the image, applying a grayscale to the image. At 508, the digital image processing component may apply a morphological gradient operation to the digital image, which is useful for edge detection (e.g., detection of rectangle edges). At 510, the image processing component may apply a binarization algorithm (e.g., OTSU) to the digital image to convert the digital image into a black and white image. At 512, the digital image processing component may connect horizontally oriented regions of the digital image. At 514, the digital image processing component may run a findContours operation on the digital image. At 516, the digital image processing component may then filter out small contours (e.g., below a threshold), for example, since the rectangle detector is concerned with large rectangles. The digital image processing component may then output the transformed digital image at 518 to the rectangle detector 206 for detection of rectangles.

Figure 6A:
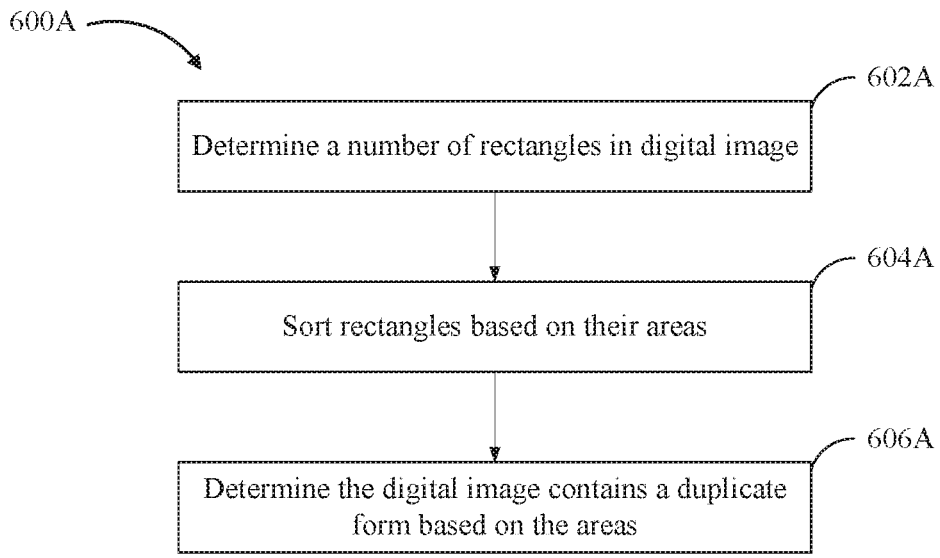
FIGS. 6A and 6B illustrate a method for identifying duplicate copies of a form in a transformed digital image, according to certain aspects of the present disclosure.
Figure 6B:
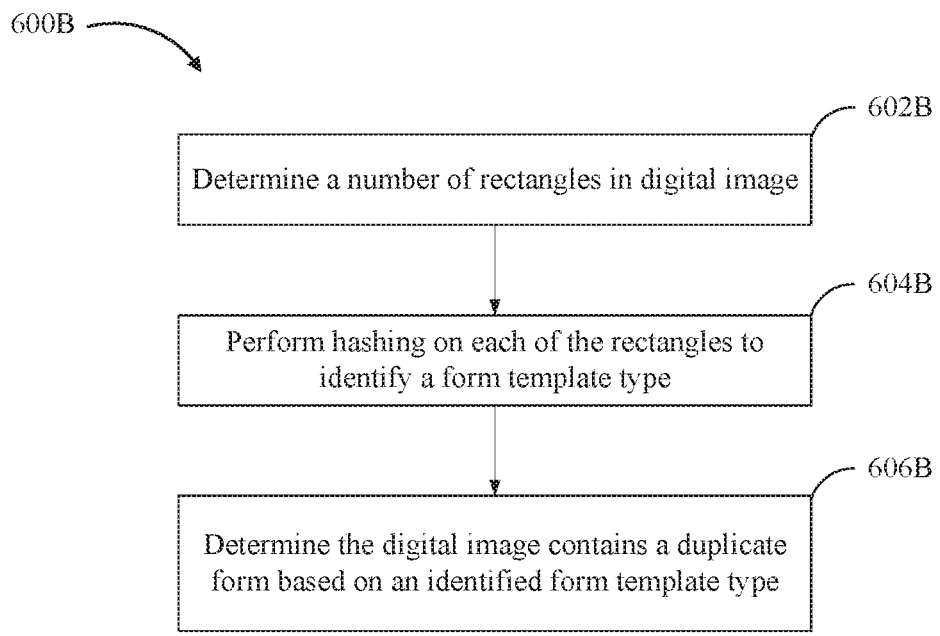

FIGS. 6A and 6B illustrate example operations 600A and 600B for identifying duplicate copies of a form in a transformed digital image, according to certain aspects of the present disclosure. According to certain aspects, example operations 600A and 600B may be performed, for example, by the rectangle detector 206 and/or the duplicate form decision component 212.

According to certain aspects, the rectangle detector 206 may receive the transformed digital image from the image processing component 202. At 602A, the rectangle detector may determine a number of rectangles in the transformed digital image. At 604A, the rectangle detector determines an area comprised by each of the detected rectangle and sorts the rectangles by area.

At 606A, the duplicate form decision component 212 decides whether the transformed digital image (and therefore the user-captured digital image) comprises duplicate copies of a form. As noted above, this decision may be based on one or more rules (e.g., decision rules 214).

For example, decision rules 214 may instruct the duplicate form decision component 212 to decide that the transformed digital image comprises duplicate copies of a form based on an area of each of the detected rectangles. For example, with reference to FIG. 4, the rectangle detector may detect a first rectangle, which for illustrative purposes, may be assumed to be the full document (e.g., the rectangle represented by 402A). The rectangle detector may then determine that the area of rectangle represented by 402A comprises 1000 pixels. The rectangle detector may then determine the next two largest rectangles in the transformed digital image to be the rectangles represented by 404A and 406A, each of which comprises an area of, say, 500 pixels.

According to certain aspects, the duplicate form decision component 212 may use the information related to the determined areas to make an inference that duplicate copied of a form exist in the transformed digital image. For example, when making a decision whether the transformed digital image comprises duplicate copies of a form, the duplicate form decision component 212 may look at the area comprised by the second and third largest rectangles in the transformed digital image and see how much area these rectangles take up as compared to the largest rectangle (i.e., the rectangle represented by the whole document in the digital image). If the duplicate form decision component 212 notices that the second and third largest rectangles take up approximately the same area as the largest rectangle, the duplicate form decision component 212 may assume that the digital image comprises duplicate copies of a form.

For example, with reference to FIG. 4, the duplicate form decision component 212 may notice that the area of the rectangle represented by 404A (e.g., 500 pixels) and the area of the rectangle represented by 406A (e.g., 500 pixels) adds up to the total number of pixels taken up by the rectangle represented by 402A (e.g., 1000 pixels). This would indicate that the digital image comprises duplicate copies of a form, since, when looking at a single copy of the form (e.g., 404A) no two individual rectangles take up the whole area of the rectangle represented by 404A. For example, the two largest rectangles in 404A are the boxes for the employer's and employee's addresses (i.e., the second and third largest rectangles). However, when the digital image only comprises a single copy of a form, the duplicate form decision component 212 would notice that the boxes for the employer's and employee's addresses do not approximately add up to the total area of the rectangle represented by 404A.

Thus, by sorting the detected rectangles and analyzing their areas, the duplicate form decision component 212 may make and inference of whether the digital image comprises duplicate copies of a form.

FIG. 6B illustrates another way (e.g., different decision rules) that the duplicate form decision component 212 may determine whether the digital image comprises duplicate copies of a form. For example, as illustrated, at 602B, the rectangle detector 206 determines a number of rectangles in the transformed digital image.

At 604B, the rectangle detector 206 performs hashing on each of the detected rectangles. For example, the rectangle detector 206 may apply a hashing function to of the detected rectangles in the transformed digital image. For example, the rectangle detector may apply an image-hashing algorithm (e.g., geometric hashing, linear combination of pixel-values, etc.) to each of the detected rectangles in the transformed digital image to generate a hash of the transformed digital image. The rectangle detector 206 may then compare the hash of the transformed digital image to a number of hashes corresponding to form templates types in a template database (e.g., stored in the computing device 110 or server 104, not shown). If the rectangle detector 206 determines that the hash of the transformed digital image matches a hash of a form template type stored in template database, the duplicate form decision component 212 may infer/decide at 606B that the transformed digital image comprises multiple copies of a form.

Another method, or decision rules that may be used, for deciding if a digital image comprises duplicate copies of a form may involve making an inference based on a on a comparison of a total number of detected rectangles in the first digital image to a standardized number of rectangles in a known form template type. For example, a typical W2 template type comprises about 80 different rectangles. According to certain aspects, if the rectangle detector 206 determines that the digital image comprises, for example, 160, 240, or 320 rectangles, the duplicate form decision component 212 may make the inference that the digital image comprises multiple copies of the W2. In other words, if the total number of detected rectangles in the digital image represents an order of magnitude greater than the standardized number of rectangles in the known form template type, the duplicate form decision component 212 may decide that the digital image comprises duplicate copies of a form.

Another method, or decision rules that may be used, for deciding if a digital image comprises duplicate copies of a form may be based on an inference regarding a number of similar rectangles that are detected. For example, after the rectangle detector 206 detects the rectangles in the digital image, the duplicate form decision component 212 may then determine whether there are a large number of similar rectangles in the digital image. According to certain aspects, similarity may be based on the areas of each detected rectangle, a horizontal/vertical width of each detected rectangle, and/or hashing (e.g., as described above) performed on each detected rectangle. For example, if the duplicate form decision component 212 detects that there are a large number of detected rectangles that approximately have the same area, the duplicate form decision component 212 may make the inference that there are multiple copies of a form in the digital image.

Another method, or decision rules that may be used, for deciding if a digital image comprises duplicate copies of a form may be based on an inference regarding a vertical and/or horizontal length of edges of large-detected rectangles in a digital image. For example, with reference to FIG. 4, the rectangle detector may detect rectangles 404A and 406A as the largest rectangles in the digital image. The duplicate form decision component 212 may then analyze the edges of the rectangles 404A and 406A and notice that there are four horizontal edges (i.e., lines) that span about 80% of the digital image (e.g., the top and bottom edge/line of each rectangle). Based on this information, the duplicate form decision component 212 may infer there are duplicate copies of a form in the digital image.

For example, in a digital image that only comprises a single copy of a form (e.g., a W2 form), the duplicate form decision component 212 should expect to see about two horizontal/vertical lines spanning most of the digital image. However, in a digital image that comprises more than a single copy of a form (e.g., 402A, which comprises the copies of the form in 404A and 406A), the duplicate form decision component 212 would notice that the digital image comprises four horizontal lines that span most of the document. Thus, the duplicate form decision component 212 may infer that the digital image comprises duplicate copies of a form.

Another method, or decision rules that may be used, for deciding if a digital image comprises duplicate copies of a form may be based on an inference regarding the spacing between horizontal/vertical edges of large-detected rectangles. For example, again with reference to FIG. 4, the duplicate form decision component 212 may analyze the edges of the rectangles 404A and 406A and notice that the spacing between the top edge of rectangle 404A and the bottom edge of rectangle 404A is relatively large whereas the spacing between the bottom edge of rectangle 404A and the top edge of rectangle 406A is relatively small. Based on these relative spacings, the duplicate form decision component 212 may make an inference that the digital image comprises duplicate copies of a form.

For example, in a digital image that only comprises a single copy of a form (e.g., a W2 form), the duplicate form decision component 212 should expect to see about two horizontal/vertical lines spanning most of the digital image. These two horizontal/vertical line should be spaced relatively far apart. However, in a digital image that comprises multiple copies of a form (e.g., 402A), the duplicate form decision component 212 would notice that the bottom edge of rectangle 404A and the top edge of rectangle 406A would be spaced relatively close together. Thus, since the duplicate form decision component 212 sees two horizontal/vertical lines spanning most of the digital image which are spaced relatively close together, the duplicate form decision component 212 may infer the digital image comprises duplicate copies of a form.

Another method, or decision rules that may be used, for deciding if a digital image comprises duplicate copies of a form may be based on an inference regarding a number of truncated rectangles detected in the digital image. For example, in some cases, the user may capture an image that comprises a full copy of a form and also a partial copy of the form (e.g., which is cut off by an edge of the digital image). When analyzing the rectangles detected in the digital image, the duplicate form decision component 212 may notice that a number of rectangles appear to be truncated. Based on this information, the duplicate form decision component 212 may infer that the digital image comprises duplicate copies of a form.

In any case, if the duplicate form decision component 212 determines that the digital image comprises duplicate copies of a form, the duplicate form decision component 212 may generate a notification and provide it either to the user alert component 120, informing the user to take another, more focused digital image or to the digital image cropper 122 in the computing device 110 or server 104, instructing it to crop the digital image such that only a single form remains in the digital image.

Figure 7:
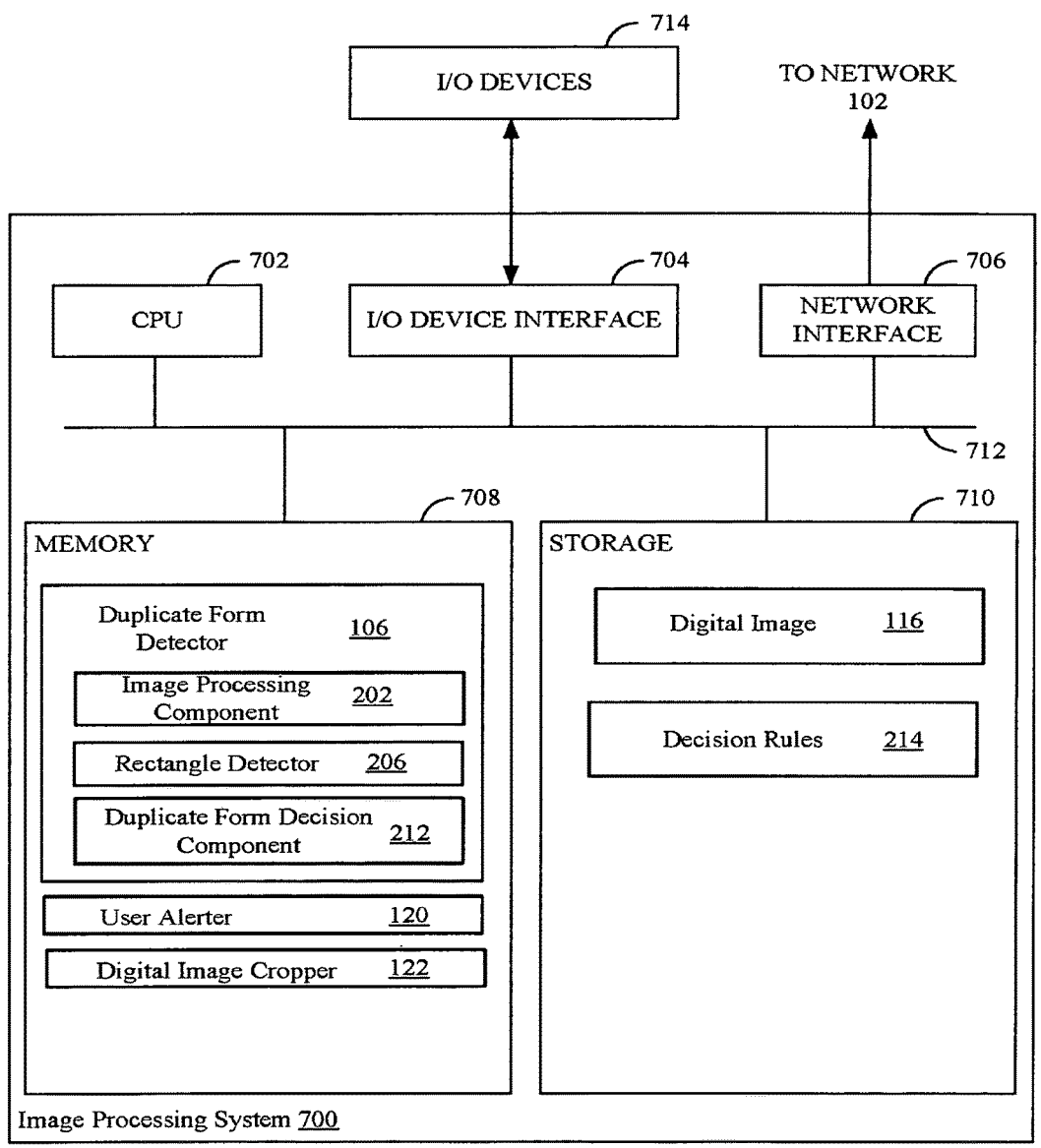
FIG. 7 illustrates an example image processing system that identifies duplicate copies of a form in a document, according to certain aspects of the present disclosure.

FIG. 7 illustrates an example image processing system 700 that identifies duplicate copies of a form in a document, according to certain aspects of the present disclosure. As shown, the image processing system 700 includes, without limitation, a central processing unit (CPU) 702, one or more I/O device interfaces 704 which may allow for the connection of various I/O devices 714 (e.g., keyboards, displays, mouse devices, pen input, etc.) to the image processing system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed or removable storage devices, such as fixed disc drives, removable memory cards or optical storage, network attached storage (NAS), or a storage area-network (SAN).

As shown, memory 708 includes a duplicate form detector 106, a user alert component 120, and a digital image cropper 122. The duplicate form detector 106 comprises an image processing component 202, a rectangle detector 206, and a duplicate form decision component 212. A digital image of a document can be sent to the duplicate form detector 106 from the I/O devices 714 or from another source, such as the network 102. The image processing component 202 can prepare the digital image for duplicate form detection. The rectangle detector 206 can determine a number of rectangles in the digital image, an area comprised by each detected rectangle, and may also perform a hashing function on each of the detected rectangles. The duplicate form decision component 212 can decide whether the digital image comprises duplicate copies of a form, for example, based on the number of rectangles, an area of each rectangle, and/or hashing of each rectangle, as described above.

As shown, storage 710 includes the digital image 116 (e.g., captured by the user) and decision rules 214. According to certain aspects, the decision rules 214 may be used by the duplicate form decision component 212 to decide whether the digital image comprises duplicate copies of a form, for example, as explained over with reference to FIGS. 6A and 6B.

As shown, storage 810 includes the digital image 116 (e.g., captured by the user) and decision rules 214. According to certain aspects, the decision rules 214 may be used by the duplicate form decision component 212 to decide whether the digital image comprises duplicate copies of a form, for example, as explained over with reference to FIGS. 6A and 6B.

According to certain aspects, if it is determined that the digital image comprises duplicate copies of a form, the duplicate form decision component 212 may generate a notification and provide it either to the user alert component 120 or the digital image cropper 122. Upon receiving the notification, the user alert component 120 may inform the user of the computing device 110 to capture another digital image, focusing on a single copy of the form. Additionally, if the notification is received by the digital image cropper 122, the digital image cropper 122 may crop out the duplicate copy of the form from the digital image. Once the digital image is cropped or the user captures another digital image with a single copy of the form in it, the computing device may transmit the digital image to a server, for example, via the network interface 706.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for determining a digital image has more than one form in the digital image, comprising:
    obtaining a digital image;
    generating a transformed digital image comprising a set of rectangles by performing one or more transformations on the digital image;
    detecting a number of rectangles in the set of rectangles in the transformed digital image;
    determining, based on the number of detected rectangles, two or more forms appear in the digital image, wherein the determination comprises:
        generating a hash of the transformed digital image by performing hashing on each rectangle in the number of detected rectangles in the transformed digital image; and
        determining the hash of the transformed digital image matches a bash of a form template type;
    generating a cropped digital image comprising one form from the two or more forms in the digital image; and
    providing the cropped digital image of the one form for processing.

2. The method of claim 1, wherein generating the transformed digital image comprising the set of rectangles by performing the one or more transformations further comprises:
    scaling down the digital image;
    applying grayscale to the digital image;
    applying a morphological gradient operation to the digital image;
    applying a binarization algorithm to the j digital image;
    connecting horizontally oriented regions in the digital image;
    running a findContours operation on the digital image; or
    filtering out certain contours from the digital image.

3. The method of claim 1, wherein determining, based on the number of detected rectangles, the two or more forms appear in the digital image further comprises:
    determining an area for each rectangle in the number of detected rectangles;
    sorting each rectangle in the number of detected rectangles based on the determined area; and
    determining, based on the sorting of each rectangle, two or more forms appear in the digital image.

4. The method of claim 1, wherein determining, based on the number of detected rectangles, the two or more forms appear in the digital image is further based on a comparison of a total of the number of detected rectangles in the transformed digital image to a standardized number of rectangles in a known form template type.

5. The method of claim 4, wherein the total of the number of detected rectangles in the transformed digital image represents an order of magnitude greater than the standardized number of rectangles in the known form template type.

6. The method of claim 1, wherein determining, based on the number of detected rectangles, the two or more forms appear in the digital image is further based on at least one of vertical edges or horizontal edges of one or more largest rectangles of the number of detected rectangles.

7. The method of claim 6, wherein determining, based on the number of detected rectangles, the two or more forms appear in the digital image is further based on a spacing between at least one of vertical edges or horizontal edges of the one or more largest rectangles of the number of detected rectangles.

8. The method of claim 1, wherein determining, based on the number of detected rectangles, the two or more forms appear in the digital image is further based on a number of truncated rectangles detected in the digital image.

9. The method of claim 1, wherein determining, based on the number of detected rectangles, the two or more forms appear in the digital image is further based on a number of similar rectangles detected in the digital image.

10. An apparatus, comprising:
    a processor, and
    a memory having instructions which, when executed by the processor, performs an operation for determining a digital image has moor than one form in the digital image, the operation comprising:
        obtaining the digital image;
        generating a transformed digital image comprising a set of rectangles by performing one or more transformations on the digital image;
        detecting a number of rectangles in the set of rectangles in the transformed digital image;
        determining, based on the number of detected rectangles, two or more forms appear in the wherein the determination comprises:
            generating a hash of the transformed digital image by performing hashing on each rectangle in the number of detected rectangles in the transformed digital image; and
            determining the hash of the transformed digital image matches a hash of a form template type;
        generating a cropped digital image comprising one form from the two or more forms in the digital image; and
        providing the cropped digital image of the one form for processing.

11. The apparatus of claim 10, wherein the operation for determining based on the number of detected rectangles, the two or more forms appear in the digital image further comprises:
    determining an area for each rectangle in the number of detected rectangles;
    sorting each rectangle in the number of detected rectangles based on the determined area; and
    determining, based on the sorting of each rectangle, two or more forms appear in the digital image.

12. A non-transitory computer-readable storage medium comprising instructions which, when executed on one or more processors, performs an operation for determining a digital image has more than one form in the digital image, comprising:
    obtaining a digital image;

generating a transformed digital image comprising a set of rectangles by performing one or more transformations on the digital image;

detecting a number of rectangles in the set of rectangles in the transformed digital image;

determining, based on the number of detected rectangles, two or more forms appear in the digital image, wherein the determination comprises:

generating a hash of the transformed digital image by performing hashing on each rectangle in the number of detected rectangles in the transformed digital image; and determining the hash of the transformed digital image matches a hash of a form template type;

generating a cropped digital image comprising one form from the two or more forms in the digital image; and providing the cropped digital image of the one form for processing.

13. The non-transitory computer-readable storage medium of claim 12, wherein the operation for determining, based on the number of detected rectangles, the two or more forms appear in the digital image further comprises:

determining an area for each rectangle in the number of detected rectangles;

sorting each rectangle in the number of detected rectangles based on the determined area; and determining, based on the sorting of each rectangle, two or more forms appear in the digital image.

14. The apparatus of claim 10, wherein generating the transformed digital image comprising the set of rectangles by performing the one or more transformations further comprises:

scaling down the digital image;

applying grayscale to the digital image;

applying a morphological gradient operation to the digital image;

applying a binarization algorithm to the digital image;

connecting horizontally oriented regions in the digital image;

running a findContours operation on the digital image; or filtering out certain contours from the digital image.

15. The apparatus of claim 10, wherein the operation for determining, based on the number of detected rectangles, the two or more forms appear in the digital image is further based on a comparison of a total of the number of detected rectangles in the transformed digital image to a standardized number of rectangles in a known form template type.

16. The apparatus of claim 15, wherein the total of the number of detected rectangles in the transformed digital image represents an order of magnitude greater than the standardized number of rectangles in the known form template type.

17. The apparatus of claim 10, wherein the operation for determining, based on the number of detected rectangles, the two or more forms appear in the digital image is further based on a number of truncated rectangles detected in the digital image.

18. The non-transitory computer-readable storage medium of claim 12, wherein generating the transformed digital image comprising the set of rectangles by performing the one or more transformations comprises:

scaling down the digital image;

applying grayscale to the digital image;

applying a morphological gradient operation to the digital image;

applying a binarization algorithm to the digital image;

connecting horizontally oriented regions in the digital image;

running a findContours operation on the digital image; or filtering out certain contours from the digital image.

19. The non-transitory computer-readable storage medium of claim 12, wherein the operation for determining, based on the number of detected rectangles, the two or more forms appear in the digital image is further based on a comparison of a total of the number of detected rectangles in the transformed digital image to a standardized number of rectangles in a known form template type.

20. The non-transitory computer-readable storage medium of claim 19, wherein the total of the number of detected rectangles in the transformed digital image represents an order of magnitude greater than the standardized number of rectangles in the known form template type.

* * * * *